(12) United States Patent
Hamburg

(10) Patent No.: US 7,830,548 B2
(45) Date of Patent: Nov. 9, 2010

(54) METHOD AND APPARATUS FOR GENERATING COLOR TONING CURVES

(75) Inventor: Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 457 days.

(21) Appl. No.: 11/328,762

(22) Filed: Jan. 9, 2006

(65) Prior Publication Data

US 2007/0159659 A1    Jul. 12, 2007

(51) Int. Cl.
G06F 15/00 (2006.01)

(52) U.S. Cl. .................. 358/1.9; 358/3.24; 358/3.27; 358/518; 358/520; 358/461; 345/589; 345/591; 345/617; 382/162; 382/167; 382/274

(58) Field of Classification Search .......... 358/1.9, 358/520, 461; 382/167, 169; 345/589, 591, 345/617
See application file for complete search history.

(56) References Cited

U.S. PATENT DOCUMENTS

| | | | |
|---|---|---|---|
| 5,146,346 A | | 9/1992 | Knoll |
| 5,153,711 A | * | 10/1992 | DesJardins .................. 348/654 |
| 5,181,068 A | * | 1/1993 | Morikawa ..................... 355/77 |
| 5,214,294 A | * | 5/1993 | Toyofuku ............... 250/559.05 |
| 5,283,671 A | * | 2/1994 | Stewart et al. .............. 358/532 |
| 5,297,058 A | * | 3/1994 | Samworth ................... 382/167 |
| 5,303,069 A | | 4/1994 | Speciner |
| 5,452,017 A | * | 9/1995 | Hickman .................... 348/646 |

(Continued)

FOREIGN PATENT DOCUMENTS

EP        595353 A1 *    5/1994

(Continued)

OTHER PUBLICATIONS

Oliver, "Tone Rendition in Television", Nov. 1950, Proceedings of the IRE, vol. 38, Issue 11, pp. 1288-1300.*

(Continued)

*Primary Examiner*—Benny Q Tieu
*Assistant Examiner*—Javier J Ramos
(74) *Attorney, Agent, or Firm*—Robert C Kowert; Meyertons, Hood, Kivlin, Kowert & Goetzel, P.C.

(57) ABSTRACT

One embodiment of the present invention provides a system that generates a set of color-toning curves which can be used for color toning (or casting) a monochrome or color image. During operation, the system receives a first set of color-toning parameters for shadow regions, a second set of color-toning parameters for highlight regions, and an invariance property which needs to be maintained during color toning. The color-toning parameters specify the color that is to be applied to the shadows and highlights. Next, the system computes a set of color-toning-curve values and a set of color-toning-curve slopes using the first set of color-toning parameters, the second set of color-toning parameters, and the invariance property. The system then generates the set of color-toning curves using the set of color-toning-curve values and the set of color-toning-curve slopes. An important aspect of the present invention is that it can generate the color-toning curves simply based on the user specified color tones for the shadow and highlight regions.

20 Claims, 2 Drawing Sheets

U.S. PATENT DOCUMENTS

| | | | |
|---|---|---|---|
| 5,568,572 A | 10/1996 | Shu | |
| 5,615,320 A | 3/1997 | Lavendel | |
| 5,625,755 A * | 4/1997 | Shu | 358/1.9 |
| 5,774,112 A | 6/1998 | Kasson | |
| 6,559,975 B1 | 5/2003 | Tolmer et al. | |
| 6,594,384 B1 | 7/2003 | Kim et al. | |
| 6,847,377 B2 | 1/2005 | Kitahara et al. | |
| 7,046,390 B2 | 5/2006 | Atkins | |
| 7,215,813 B2 * | 5/2007 | Graves et al. | 382/167 |
| 2002/0180687 A1 * | 12/2002 | Webber | 345/107 |
| 2003/0235342 A1 * | 12/2003 | Gindele | 382/260 |
| 2004/0057632 A1 * | 3/2004 | Gindele | 382/274 |
| 2004/0197022 A1 * | 10/2004 | Gonsalves | 382/167 |
| 2005/0168595 A1 * | 8/2005 | White | 348/222.1 |
| 2005/0238234 A1 * | 10/2005 | Lin | 382/199 |
| 2007/0195347 A1 * | 8/2007 | Momose et al. | 358/1.9 |

FOREIGN PATENT DOCUMENTS

| | | |
|---|---|---|
| WO | 92/04800 | 3/1992 |
| WO | 2005/009027 | 1/2005 |

OTHER PUBLICATIONS

International Search Report and Written Opinion for PCT/US2007/060226, mailed Aug. 14, 2007, 11 pages.

S. Grace Chan, Zoran Cvetkovic, and Martin Vetterli, "Resolution Enhancement of Images Using Wavelet Transform Extreme Extrapolation," IEEE, 0-7803-2431-5*95, 1995, pp. 2379-2382.

Bae, et al., "Two-Scale Tone Management for Photographic Look," Computer Scient of Artificial Intelligence Laboratory, Massachusetts Institute of Technology, 2006 ACM, 9 pages.

* cited by examiner

METHOD AND APPARATUS FOR GENERATING COLOR TONING CURVES

BACKGROUND

1. Field of the Invention

The present invention relates to techniques for color toning. More specifically, the present invention relates to a method and an apparatus for generating a set of color-toning curves which can be used to color tone an image.

2. Related Art

The term "black-and-white" is usually a misnomer when applied to monochrome prints. Since pure (or neutral) "black-and-white" images usually look "lifeless," artists like to impart a color to monochrome images. For example, an artist might want to warm the highlight regions (making them more orange) in an image while cooling the shadows (making them more blue). This process of imparting a color to a monochrome image is called "color toning." Note that color toning (or casting) can also be applied to color images.

There are a number of prior art techniques for color toning. One approach uses multi-tone curves which specify particular amounts of ink to be used for particular input gray levels. These inks then combine to produce a color-toned image when printed. For example, if one wanted to create an image with cooler shadows and warmer highlights, one could build a tri-tone combining some combination of black ink applied in proportion to the gray level together with an application of blue ink only in the shadows and orange ink only in the highlights. Another color toning approach uses gradient maps which specify mappings for the colors in an image and essentially provides a way to specify the application of color in particular regions of an image. Yet another approach is based on color balancing. In this approach, a split tone effect is generated by adjusting the color balance in the highlights and shadows.

Unfortunately, these prior art techniques have a number of disadvantages. First, the techniques are cumbersome to use. Typically a user has to manually specify the color toning curves. To do this, the user may need to go through multiple trial and error iterations before obtaining the correct color toning curve. Second, the techniques may generate relatively harsh toning curves that clip off portions of the range in order to achieve their effects. Third, these techniques can lead to undesirable side effects. For example, prior art techniques may cause shadows to become darker and highlights to become brighter, which is usually undesirable.

Hence, what is needed is a method and an apparatus for color toning which is easy to use and which generates smooth transitions between the various color tones without causing undesirable side effects.

SUMMARY

One embodiment of the present invention provides a system that generates a set of color-toning curves which can be used for color toning (or casting) a monochrome or color image. During operation, the system receives a first set of color-toning parameters for shadow regions, a second set of color-toning parameters for highlight regions, and an invariance property which needs to be maintained during color toning. The color-toning parameters specify the color that is to be applied to the shadow and highlight regions. Next, the system computes a set of color-toning-curve values and a set of color-toning-curve slopes using the first set of color-toning parameters, the second set of color-toning parameters, and the invariance property. The system then generates the set of color-toning curves using the set of color-toning-curve values and the set of color-toning-curve slopes. An important aspect of the present invention is that it can generate the color-toning curves simply based on the user specified color tones for the shadow and highlight regions.

In a variation on this embodiment, a set of color-toning parameters includes a hue value and a saturation value.

In a variation on this embodiment, the set of color-toning curves are used to generate a color-toned image from an input image. Specifically, the set of color-toning curves are used to compute the color channel values of a pixel in the color-toned image based on the color channel values of the corresponding pixel in the input image.

In a further variation on this embodiment, the invariance property preserves luminosity by ensuring that the luminosity of a pixel in the color-toned image is equal to the luminosity of the corresponding pixel in the input image.

In a further variation on this embodiment, the input image is a grayscale image, and the color-toned image is a color image. Additionally, the shadow color tone is specified using a first hue value and a first saturation value, and the highlight color tone is specified using a second hue value and a second saturation value.

In a variation on this embodiment, the system computes the set of color-toning-curve values and the set of color-toning-curve slopes by first generating a set of linear equations on the set of color-toning-curve values and the set of color-toning-curve slopes using the first set of color-toning parameters, the second set of color-toning parameters, and the invariance property. The system then solves the set of linear equations to determine the set of color-toning-curve values and the set of color-toning-curve slopes.

In a variation on this embodiment, the system generates the set of color-toning curves by fitting a set of cubic functions using the set of color-toning-curve values and the set of color-toning-curve slopes.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Color Toning Curves

Color toning for grayscale images via curves—however those curves may be defined—can be treated mathematically as mapping the gray intensity value x through three functions to produce the output color channel values, such as an RGB (Red, Green, Blue) triplet.

Figure 1A:
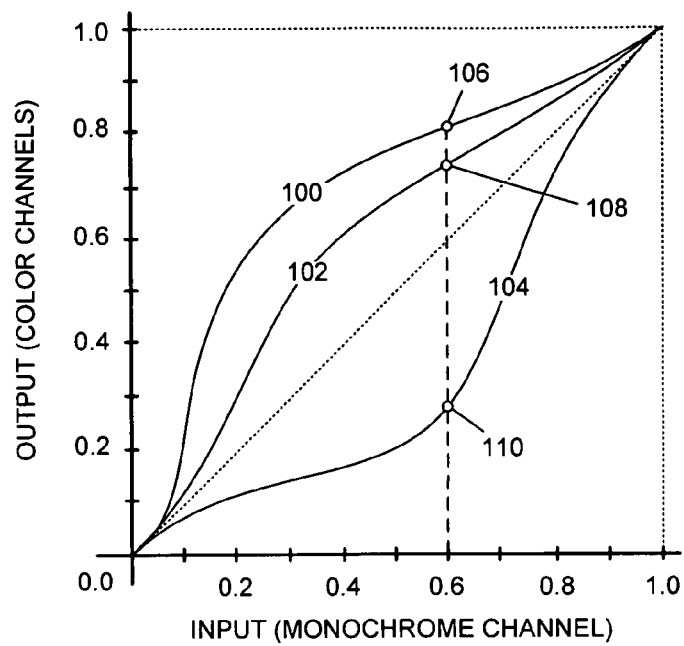
FIG. 1A illustrates a set of color toning curves that operate on a monochrome image in accordance with an embodiment of the present invention.

FIG. 1A illustrates a set of color toning curves that operate on a monochrome image in accordance with an embodiment of the present invention.

Color-toning curves, such as curves 100, 102, and 104, specify how to impart a color tone to an image. Each color toning curve is typically associated with a color channel and is represented by a mathematical function. For example, curves 100, 102, and 104 can be associated with red, green, and blue color channels, respectively, and can be represented by mathematical functions R(x), G(x), and B(x), respectively.

In FIG. 1A, the abscissa specifies the input channel intensity (e.g., grayscale intensity), and the ordinate specifies the intensity of the output color channels (e.g., RGB triplet). For example, if a pixel in the input monochrome image has an intensity of x=0.6, the output color channels will have intensities R(0.6), G(0.6), and B(0.6), as illustrated by points 106, 108, and 110, respectively.

In one embodiment, color toning a monochrome image does not change the original image data. Instead, the output color information is generated "on the fly." This can be beneficial because it preserves the original image content. On the other hand, in another embodiment, the original image data is replaced by the color-toned image data.

Note that color toning (or casting) can also be used on color images.

Figure 1B:
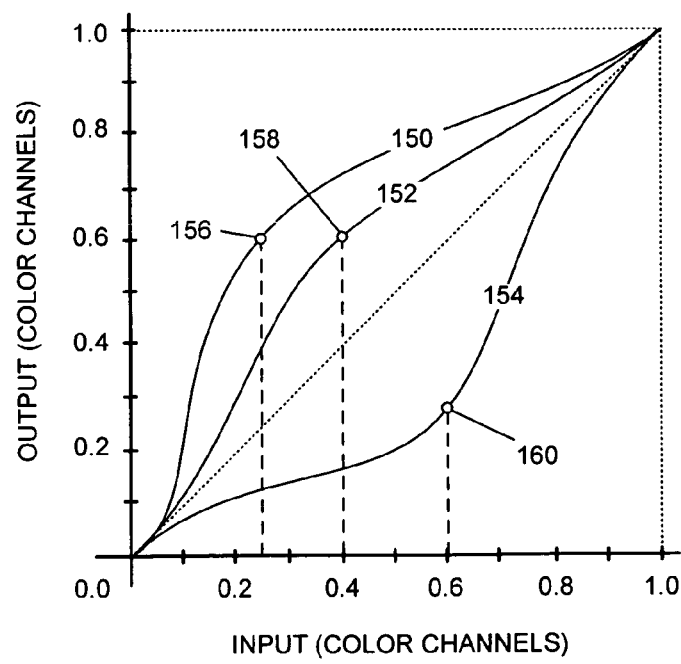
FIG. 1B illustrates a set of color toning curves that operate on a color image in accordance with an embodiment of the present invention.

FIG. 1B illustrates a set of color toning curves that operate on a color image in accordance with an embodiment of the present invention.

Curves 150, 152, and 154 can be used to determine the color channel intensities of a pixel after color toning is applied to a color image. For example, suppose that the input image is an RGB (Red, Green, Blue) image with a red intensity of r=0.25, green intensity of g=0.4, and blue intensity of b=0.6. Further, assume that curves 100, 102, and 104 are associated with the red, green, and blue channels, respectively, and are represented by mathematical functions R(r), G(g), and B(b), respectively. In this case, the output color channel intensities will be given by R(0.25), G(0.4), and B(0.6), as illustrated by points 156, 158, and 160, respectively.

It will be evident that the quality of color toning depends heavily on the quality of the color-toning curves. Unfortunately, it is very difficult to construct high quality color-toning curves manually.

It would be very advantageous if high quality color-toning curves can be generated automatically by simply asking the user to specify the color tone (e.g., hue and saturation) that he/she wants to apply to the shadow and highlight regions. Recall that prior art techniques cannot generate high quality color-toning curves based on such intuitive input specifications. Instead, prior art techniques typically require the user to spend an enormous amount of time trying to generate high quality color-toning curves by trial and error.

One embodiment of the present invention provides an approach to generate split toning curves that require the user to provide relatively simple specifications of the colors for both the highlights and shadows. The embodiment generates smooth color-toning curves that do not clip detail in the channels while preserving overall luminosity. Further, the color-toning effects produced by the embodiment are superior to those produced using prior art techniques (e.g., "color balancing") and easier to control than prior art techniques (e.g., multi-tone simulations and gradient maps).

The present invention uses the following non-obvious insight: if we want to introduce a particular hue into the shadows or highlight regions, we can do so while still mapping black to black and white to white by focusing on the slopes of the red, green, and blue curves at those extreme points.

Hue and Saturation

Hue is defined based first on a sorting of the red, green, and blue components to determine a sextant in hue space and then looking at where the middle value lies relative to the minimum and maximum values. For example, in traditional hue angle measurement running from red at zero degrees to yellow at 60 degrees, the ordering of the color components is: blue≦green≦red. The hue angle in this region can be determined using the expression $$60 \times \frac{(\text{green} - \text{blue})}{(\text{green} - \text{red})}.$$

In the HSL (Hue, Saturation, Lightness) color space, hue angles are determined using the following expression:

$$H = \begin{cases} 60 \times \frac{G-B}{\text{MAX} - \text{MIN}} + 0, & \text{if MAX} = R \\ 60 \times \frac{B-R}{\text{MAX} - \text{MIN}} + 120, & \text{if MAX} = G \\ 60 \times \frac{R-G}{\text{MAX} - \text{MIN}} + 240, & \text{if MAX} = B \end{cases}$$

Saturation intuitively refers to the "purity" of a specific hue. A highly saturated hue has a vivid, intense color, while a less saturated hue appears more muted and gray. With no saturation at all, the hue becomes a shade of gray. In the HSL color space, saturation is defined using the following expression:

$$S = \begin{cases} \frac{\text{MAX} - \text{MIN}}{\text{MAX} + \text{MIN}} = \frac{\text{MAX} - \text{MIN}}{2L}, & \text{if } L \leq \frac{1}{2} \\ \frac{\text{MAX} - \text{MIN}}{2 - (\text{MAX} + \text{MIN})} = \frac{\text{MAX} - \text{MIN}}{2 - 2L}, & \text{if } L \geq \frac{1}{2} \end{cases}$$

where, L=(MAX+MIN)/2.

Process of Generating a Set of Color-Toning Curves

Figure 2:
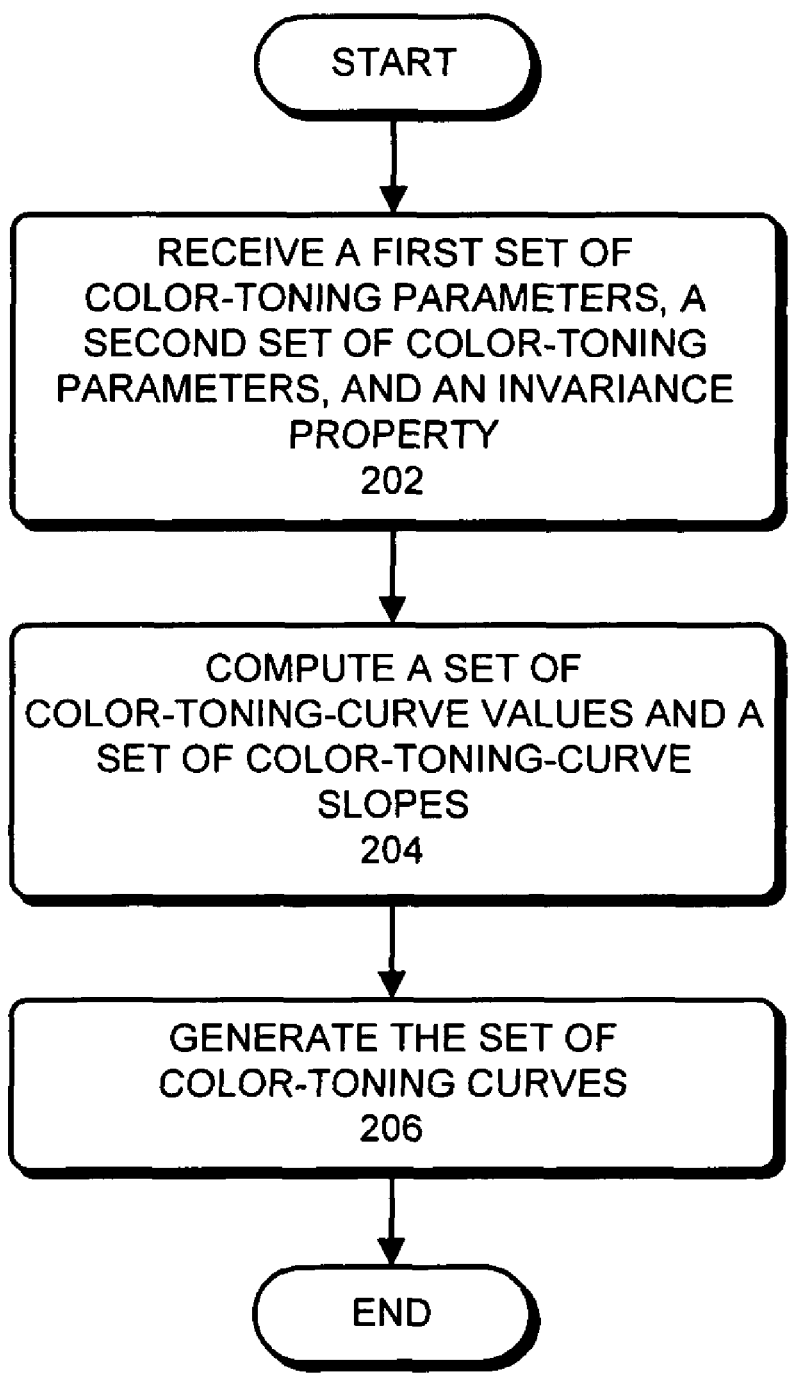
FIG. 2 presents a flowchart that illustrates a process for generating a set of color-toning curves in accordance with an embodiment of the present invention.

FIG. 2 presents a flowchart that illustrates a process for generating a set of color-toning curves in accordance with an embodiment of the present invention.

The process usually begins by receiving a first set of color-toning parameters for shadow regions, a second set of color-toning parameters for highlight regions, and an invariance property which needs to be maintained during color toning (step 202).

The color-toning parameters specify the color that is to be applied to the shadows and highlights. In one embodiment, the color-toning parameters include the hue and the saturation of the shadow and the highlight color tones. The invariance property can be represented by an equation that specifies a relationship between the input and output color channel values.

Next, the system computes a set of color-toning-curve values and a set of color-toning-curve slopes using the first set of color-toning parameters, the second set of color-toning parameters, and the invariance property (step 204).

An important aspect of the present invention is that it can generate the color-toning curves simply based on the user specified hue and saturation values. Computing the curve slopes is an important and non-obvious step that allows the present invention to generate the color-toning curves. One technique to compute the set of color-toning-curve slopes is described below.

Note that the hue angle is undefined for neutral (grayscale) colors where the components are all equal because this involves a case where we would be dividing 0 by 0. Now, if we want to map black (x=0) in the grayscale image to black (r=g=b=0) in the color toned image, then we are essentially specifying that R(0)=G(0)=B(0)=0 and hence there is no hue at black.

There is, however, a hue at black when we take the limit on the hue function H(R(x), G(x), B(x)) as x approaches zero. This is an important insight that is used by the present invention to generate the set of color-toning curve slopes.

Specifically, using l'Hospital's rule, the limit will be equal to H(R'(0), G'(0), B'(0)), where H(R(x), G(x), B(x)) is the hue function, and R'(x), G'(x), and B'(x) are the first derivatives of R(x), G(x), and B(x), respectively. This means that given a hue angle, we can calculate a ratio between the slopes of the R(x), G(x), and B(x) curves at zero that need to hold in order to achieve a particular hue in the limit at black.

Further, if we insist that white (x=1) in the grayscale image map to white (r=g=b=1) in the color toned image, then the hue angle at x=1 is again of the form 0/0 but again can be found using l'Hospital's rule to be equal to H(R'(1), G'(1), B'(1)).

Note that the above mathematical formula gives us a relationship amongst the slopes of the color toning curves, but it doesn't give us the actual slope values. However, as described below, the actual slopes of the color tuning curves can be calculated by exploiting other constraints on the color-toning curves.

First, we describe an approach to calculate the actual values for the slopes in HSL (Hue, Saturation, Lightness) color space. HSL defines lightness as the average of the minimum and maximum components. For example, in the hue range from cyan to blue, we have: red≦green≦blue. Hence, lightness is defined as L=(red+blue)/2. If we wanted the curves to preserve HSL lightness, then we would want L(R(x), G(x), B(x))=x. Writing out the formula for L(R(x), G(x), B(x)), we obtain the following constraint on the color-toning curves:

$$0.5 \cdot (\text{Min}(R(x), G(x), B(x)) + \text{Max}(R(x), G(x), B(x))) = x.$$

Note that we can't readily take the derivative of the left hand side in the above equation because of the Min and Max functions, but in the regions where we have defined the hue angle, we have thereby also defined the ordering on the components. For example, in the case above where the hue lies between cyan and blue, Min is equal to R(x), and Max is equal to B(x). Hence, the above constraint reduces to (R(x)+B(x))/2=x. Now we can take the derivative of the left hand side. Taking derivatives and simplifying, we get R'(x)+B'(x)=2. At x=0, we have R'(0)+B'(0)=2, which gives us a relationship between the slopes. (Similar constraints can be determined for other hue sextants.)

To obtain another relationship between the slopes, we turn to saturation. As described above, saturation is defined differently in HSL for light colors and dark colors but in each case it is based on the difference between the maximum and minimum components with a value of zero when the components are equal and a value of 100% when the values are as far apart as possible given the other constraints.

In the shadows, HSL saturation is given by:

$$S(R(x), G(x), B(x)) = \frac{\text{Min}(R(x), G(x), B(x)) - \text{Max}(R(x), G(x), B(x))}{\text{Min}(R(x), G(x), B(x)) + \text{Max}(R(x), G(x), B(x))}.$$

Saturation reaches its maximum (100%) when the minimum component is zero and its minimum (0) when the maximum and minimum components are equal. Note that S becomes indeterminate as we approach black. However, we can use l'Hospital's rule to calculate the saturation value in the limit. As before, we resolve Max and Min based on the hue angle. For example, when the hue angle lies between cyan and blue, Min is equal to R(x), and Max is equal to B(x). At x=0, we get S(R(0), G(0), $$S(R(0), G(0), B(0)) = \frac{B'(0) - R'(0)}{B'(0) + R'(0)}.$$

Simplifying, we get (S(R(0), G(0), B(0))−1) B'(0)+(S(R(0), G(0), B(0))+1)·R'(0)=0. Recall that S(R(0), G(0), B(0)) is a known quantity (because it is a user input), whereas B'(0) and R'(0) are unknowns which we are trying to determine.

Together with the linear equation from lightness, we have two independent linear equations in R'(0) and B'(0). Now, we can solve the linear equations to determine R'(0) and B'(0), and then calculate G'(0) using the shadow hue angle (which is a known quantity because it is a user input) and using the hue angle formula H(R'(0), G'(0), B'(0)).

Using a similar process, we can calculate R'(1), G'(1), and B'(1). At the end of this step, we have the values and slopes of R(x), G(x), and B(x) at x=0 and x=1.

Note that if any of the slopes are too high or too low, they can cause the curves to become decreasing or to exceed the range [0, 1]. Hence, it is important to ensure that the slopes are within a "valid" slope range. If a slope is outside this range, then the slope value can be set to either the maximum or the minimum of the "valid" slope range, as appropriate. For example, suppose the "valid" slope range is [0.2, 5]. Further, assume that solving the linear equations gives us R'(0)=7 and B'(0)=0.1. Note that both R'(0) and B'(0) are outside the "valid" slope range. Hence, we can set R'(0)=5 and B'(0)=0.2 before continuing with our computations.

Another approach to ensure that slopes are within a "valid" range is to force the user to choose color tones that do not have high saturation values. Yet another approach would be to reduce the saturation values if the user inputs a very high saturation value. For example, if the user inputs a color tone with saturation of 100%, we can reduce it to 70% (or any other suitable value) before proceeding with computations. Yet another approach to keep the slopes within the "valid" range is to treat the saturation control as adjusting the spread between the maximum and minimum component slopes subject to the additional constraints of preserving luminance.

The reason there are a number of techniques to ensure that the slopes are within the "valid" range is because while hue is a well specified notion for color and hence there are firm constraints that must be imposed to achieve a particular hue, saturation tends to be a less rigorously specified notion that translates generally toward a notion of how much color is present. For example, the HSV and HSL color spaces share the same definition of hue, but they use different definitions for saturation. Hence, so long as the technique preserves the expected effects that lower saturations are closer to neutral gray and higher saturations have a stronger sense of color, the technique will be sufficient for user needs.

Continuing with the flowchart in FIG. 2, the system then generates the set of color-toning curves using the set of color-toning-curve values and the set of color-toning-curve slopes (step 206).

In one embodiment of the present invention, the system fits a cubic function each for $R(x)$, $G(x)$, and $B(x)$ based on these values and slopes. (It will be evident that a unique cubic curve can be identified if we know the values and the slopes of the curve at two distinct points on the curve.)

Note that the techniques and systems described above are general in nature, and can be applied to other color spaces and/or invariance properties.

For example, the luminance of RGB is generally defined as a weighted average of red, green, and blue. Formally, luminance is defined as $Y(R(x), G(x), B(x)) = Y_{RGB}(X) = w_R \cdot R(x) + w_G \cdot G(x) + w_B \cdot B(x)$, where $w_R$, $w_G$, and $w_B$ are the weights of red, green, and blue, respectively.

Instead of preserving lightness, if we wanted to preserve luminance, we get the invariance property $Y_{RGB}(X) = x$. Expanding $Y_{RGB}(X)$, and taking the derivative of both sides, we get the following constraint:

$$w_R \cdot R'(x) + w_G \cdot G'(x) + w_B \cdot B'(x) = 1.$$

As before, the above constraint gives rise to a linear equation in $R'(0)$, $G'(0)$, and $B'(0)$ when $x=0$ (and likewise another linear equation for $x=1$).

Next, we can obtain a set of linear equations which can be solved to determine the required curve values and slopes. We can then fit cubic curves using the values and slopes to obtain the color toning curves $R(x)$, $G(x)$, and $B(x)$.

A nice property of cubic curves is that they will really preserve luminance. This is because if $R(x)$, $G(x)$, and $B(x)$ are all cubic curves, then so is $Y_{RGB}(X)$ because it is a linear combination of $R(x)$, $G(x)$, and $B(x)$.

Further, note that for $x=0$ and $x=1$, we have $Y_{RGB}(X)=x$, and $Y'_{RGB}(X)=1$. In other words, we have $Y_{RGB}(0)=0$, $Y_{RGB}(1)=1$, $Y'_{RGB}(0)=1$, and $Y'_{RGB}(1)=1$. Note that the cubic function that satisfies these boundary conditions is simply the identity function, namely $Y_{RGB}(X)=x$. Hence, if we compute the slopes using the luminance constraint, and if we use cubic curves, we will really preserve luminance throughout the [0, 1] range.

To summarize, one embodiment of the present invention provides a way to generate color toning curves for grayscale (or color) images based on hue and saturation controls for the shadows and highlights while satisfying an invariance property, such as preservation of luminance or HSL lightness. These curves take the shadows and highlights to the indicated hue and saturation values at the limits of black and white while still actually mapping black to black and white to white. Moreover, these curves ensure that the transition from the shadow color tone to the highlight color tone is smooth.

Note that these curves are equally applicable to RGB images. For example, instead of calculating $R(x)$, $G(x)$, and $B(x)$, we can calculate $R(r)$, $G(g)$, and $B(b)$. This will impart a color cast to the shadows and highlights of a color image while preserving black and white in a manner similar to the split toning for grayscale images.

Embodiments of the present invention provide intuitive color-toning controls to the user. In contrast to prior art techniques, embodiments of the present invention do not require the user to manually specify the color-toning curves. Instead, embodiments of the present invention can automatically generate the color-toning curves simply based on the hue and saturation values for the shadow and highlight regions. The present invention can do this because it uses the following non-obvious insight: the slopes of the color-toning curves can be computed by solving a set of linear equations on the slopes, wherein the set of linear equations are generated by taking the limit of the hue, saturation, and invariance functions. The slopes can then be used to generate the color-toning curves.

Additionally, note that since the luminance (or lightness) is preserved during color toning, embodiments of the present invention can reduce or eliminate undesirable side effects.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art.

For example, one way of using higher order curves (rather than cubic curves) is to observe that the chain rule says that we can multiply the derivatives to get the final derivative if we compose a series of functions. Hence, we can compose two or more cubic curves with end point slopes chosen to multiply together to the final target slopes. This can result in a different transition between the end points. At the same time, since each set of cubic curves is constructed to preserve luminance, we can preserve luminance in the final result as well.

Another way of using higher order curves is to require the user to provide more data, such as the rate at which the color-toning curves transition from the shadow color to the highlight color.

The above disclosure is not intended to limit the present invention. The scope of the present invention is defined by the appended claims.

What is claimed is:

1. A computer-implemented method for generating a set of color-toning curves, the method comprising:
using a computer to perform:
receiving an input image;
receiving a first set of color-toning parameters for shadow regions, a second set of color-toning parameters for highlight regions, and an invariance property to be maintained during color toning, wherein the invariance property is represented by an equation that specifies a relationship between input values and output color channel values;
computing a set of color-toning-curve values and a set of color-toning-curve slopes using the first set of color-toning parameters, the second set of color-toning parameters, and the invariance property, wherein computing the set of color-toning-curve values and the set of color-toning-curve slopes comprises:
generating a set of linear equations on the set of color-toning-curve values and the set of color-toning-curve slopes using the first set of color-toning parameters, the second set of color-toning parameters, and the invariance property, wherein generating the set of linear equations comprises taking the limit of a hue function; and solving the set of linear equations to determine the set of color-toning-curve values and the set of color-toning-curve slopes;

generating the set of color-toning curves using the set of color-toning-curve values and the set of color-toning-curve slopes; and generating a color-toned image based on the input image and the set of color-toning curves.

2. The method of claim 1, wherein each set of color-toning parameters includes:
a user-specified hue value; and
a user-specified saturation value.

3. The method of claim 1,
wherein the set of color-toning curves are used to compute the color channel values of a pixel in the color-toned image based on the color channel values of the corresponding pixel in the input image.

4. The method of claim 3, wherein the invariance property preserves luminosity by ensuring that the luminosity of a pixel in the color-toned image is equal to the luminosity of the corresponding pixel in the input image.

5. The method of claim 3,
wherein the input image is a grayscale image;
wherein the color-toned image is a color image;
wherein the shadow color tone is specified using a first hue value and a first saturation value;
wherein the highlight color tone is specified using a second hue value and a second saturation value.

6. The method of claim 1, wherein generating the set of color-toning curves involves fitting a set of cubic functions using the set of color-toning-curve values and the set of color-toning-curve slopes.

7. The method of claim 1, wherein the first set of color-toning parameters for shadow regions are user-specified, wherein the second set of color-toning parameters for highlight regions are user-specified, and wherein the set of color-toning curves are generated dependent upon the user-specified first set of color-toning parameters for shadow regions and the user-specified second set of color-toning parameters for highlight regions without requiring the user to specify the color-toning curves themselves.

8. A computer-readable storage device storing instructions that when executed by a computer cause the computer to perform a method for generating a set of color-toning curves, the method comprising:
receiving an input image;
receiving a first set of color-toning parameters for shadow regions, a second set of color-toning parameters for highlight regions, and an invariance property to be maintained during color toning, wherein the invariance property is represented by an equation that specifies a relationship between input values and output color channel values;
computing a set of color-toning-curve values and a set of color-toning-curve slopes using the first set of color-toning parameters, the second set of color-toning parameters, and the invariance property, wherein computing the set of color-toning-curve values and the set of color-toning-curve slopes comprises:
generating a set of linear equations on the set of color-toning-curve values and the set of color-toning-curve slopes using the first set of color-toning parameters, the second set of color-toning parameters, and the invariance property, wherein generating the set of linear equations comprises taking the limit of a hue function; and
solving the set of linear equations to determine the set of color-toning-curve values and the set of color-toning-curve slopes;
generating the set of color-toning curves using the set of color-toning-curve values and the set of color-toning-curve slopes; and
generating a color-toned image based on the input image and the set of color-toning curves.

9. The computer-readable storage device of claim 8, wherein each set of color-toning parameters includes:
a user-specified hue value; and
a user-specified saturation value.

10. The computer-readable storage device of claim 8,
wherein the set of color-toning curves are used to compute the color channel values of a pixel in the color-toned image based on the color channel values of the corresponding pixel in the input image.

11. The computer-readable storage device of claim 10, wherein the invariance property preserves luminosity by ensuring that the luminosity of a pixel in the color-toned image is equal to the luminosity of the corresponding pixel in the input image.

12. The computer-readable storage device of claim 10,
wherein the input image is a grayscale image;
wherein the color-toned image is a color image;
wherein the shadow color tone is specified using a first hue value and a first saturation value;
wherein the highlight color tone is specified using a second hue value and a second saturation value.

13. The computer-readable storage device of claim 8, wherein generating the set of color-toning curves involves fitting a set of cubic functions using the set of color-toning-curve values and the set of color-toning-curve slopes.

14. The computer-readable storage device of claim 8, wherein the first set of color-toning parameters for shadow regions are user-specified, wherein the second set of color-toning parameters for highlight regions are user-specified, and wherein the set of color-toning curves are generated dependent upon the user-specified first set of color-toning parameters for shadow regions and the user-specified second set of color-toning parameters for highlight regions without requiring the user to specify the color-toning curves themselves.

15. An apparatus for generating a set of color-toning curves, the apparatus comprising:
at least one processor; and
a memory coupled to the at least one processor, wherein the memory stores program instructions that are executable by the at least one processor to:
receive an input image;
receive a first set of color-toning parameters for shadow regions, a second set of color-toning parameters for highlight regions, and an invariance property to be maintained during color toning, wherein the invariance property is represented by an equation that specifies a relationship between input values and output color channel values;
compute a set of color-toning-curve values and a set of color-toning-curve slopes using the first set of color-toning parameters, the second set of color-toning parameters, and the invariance property, wherein, in computing the set of color-toning-curve values and the set of color-toning-curve slopes, the program instructions are executable by the at least one processor to:
generate a set of linear equations on the set of color-toning-curve values and the set of color-toningcurve slopes using the first set of color-toning parameters, the second set of color-toning parameters, and the invariance property, wherein, in generating the set of linear equations, the program instructions are executable by the at least one processor to take the limit of a hue function; and solve the set of linear equations to determine the set of color-toning-curve values and the set of color-toning-curve slopes;

generate the set of color-toning curves using the set of color-toning-curve values and the set of color-toning-curve slopes; and generate a color-toned image based on the input image and the set of color-toning curves.

16. The apparatus of claim 15, wherein each set of color-toning parameters includes:

a user-specified hue value; and a user-specified saturation value.

17. The apparatus of claim 15, wherein the set of color-toning curves are used to generate a color-toned image from an input image;

wherein the set of color-toning curves are used to compute the color channel values of a pixel in the color-toned image based on the color channel values of the corresponding pixel in the input image;

wherein the invariance property preserves luminosity by ensuring that the luminosity of a pixel in the color-toned image is equal to the luminosity of the corresponding pixel in the input image.

18. The apparatus of claim 17, wherein the input image is a grayscale image;

wherein the color-toned image is a color image;

wherein the shadow color tone is specified using a first hue value and a first saturation value;

wherein the highlight color tone is specified using a second hue value and a second saturation value.

19. The apparatus of claim 15, wherein the generating mechanism is configured to fit a set of cubic functions using the set of color-toning-curve values and the set of color-toning-curve slopes.

20. The apparatus of claim 15, wherein the first set of color-toning parameters for shadow regions are user-specified, wherein the second set of color-toning parameters for highlight regions are user-specified, and wherein the set of color-toning curves are generated dependent upon the user-specified first set of color-toning parameters for shadow regions and the user-specified second set of color-toning parameters for highlight regions without requiring the user to specify the color-toning curves themselves.

* * * * *